(12) United States Patent
Acker et al.

(10) Patent No.: US 9,818,181 B1
(45) Date of Patent: Nov. 14, 2017

(54) SHEAROGRAM GENERATION ALGORITHM FOR MOVING PLATFORM BASED SHEAROGRAPHY SYSTEMS

(71) Applicant: BAE SYSTEMS Information and Electronic Systems Integration Inc., Nashua, NH (US)

(72) Inventors: Andrew N. Acker, Honolulu, HI (US); Michael L. Dichner, Kailua, HI (US); Michael J. DeWeert, Kailua, HI (US); Brian P. Farm, South Porland, ME (US); Tamara O'Toole, Pensacola Beach, FL (US); Clint Yoshimura, Honolulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 6 days.

(21) Appl. No.: 15/217,396

(22) Filed: Jul. 22, 2016

Related U.S. Application Data

(60) Provisional application No. 62/196,595, filed on Jul. 24, 2015.

(51) Int. Cl.
G06T 7/00 (2017.01)
G01B 9/02 (2006.01)
G01V 8/10 (2006.01)
G06T 5/20 (2006.01)
G06T 7/37 (2017.01)

(52) U.S. Cl.
CPC .......... *G06T 7/001* (2013.01); *G01B 9/02087* (2013.01); *G01B 9/02096* (2013.01); *G01V 8/10* (2013.01); *G06T 5/20* (2013.01); *G06T 7/37* (2017.01); *G06T 2207/10004* (2013.01); *G06T 2207/20024* (2013.01); *G06T 2207/20056* (2013.01)

(58) Field of Classification Search
CPC .. G06T 7/001; G06T 7/37; G06T 5/20; G06T 2207/20056; G06T 2207/10004; G06T 2207/20024; G01V 8/10; G01B 9/02087; G01B 9/02096
USPC ....................................................... 382/108
See application file for complete search history.

(56) References Cited

U.S. PATENT DOCUMENTS

| | | | |
|---|---|---|---|
| 4,350,443 | A | 9/1982 | Williamson |
| 6,040,900 | A | 3/2000 | Chen |
| 6,285,447 | B1 | 9/2001 | Parker et al. |
| 6,584,215 | B1 | 6/2003 | Mahner |
| 6,717,681 | B1 | 4/2004 | Bard et al. |
| 8,553,233 | B2 | 10/2013 | Newman |
| 8,596,128 | B2 | 12/2013 | Kurtz |
| 8,717,577 | B1 * | 5/2014 | Kokobun ............ G01B 11/162 356/520 |

(Continued)

*Primary Examiner* — Amandeep Saini
(74) *Attorney, Agent, or Firm* — Sand & Sebolt, LPA

(57) ABSTRACT

A system and method are presented for generating shearograms from raw specklegram images which may, for example, be collected from airborne or other mobile shearography equipment. The system and method is used to detect and characterize buried mines, improvised explosive devices (IEDs), and underground tunnels, bunkers, and other structures. Amongst other purposes, the system and method may also be used for rapid scanning of ship hulls and aircraft for hidden structural defects, rapid pipeline inspection, and non-contact acoustic sensing for in-water and underground sources.

20 Claims, 8 Drawing Sheets

(56) References Cited

U.S. PATENT DOCUMENTS

| | | |
|---|---|---|
| 8,804,132 B1 | 8/2014 | Saxer |
| 8,873,068 B2 | 10/2014 | Blain et al. |
| 2001/0040682 A1 | 11/2001 | Lindsay et al. |
| 2013/0003152 A1 | 1/2013 | Belousov et al. |
| 2015/0338208 A1 | 11/2015 | DeWeert et al. |

* cited by examiner

SHEAROGRAM GENERATION ALGORITHM FOR MOVING PLATFORM BASED SHEAROGRAPHY SYSTEMS

CROSS REFERENCE TO RELATED APPLICATIONS

This application claims the benefit of U.S. Provisional Application Ser. No. 62/196,595, filed Jul. 24, 2015; the disclosure of which is incorporated herein by reference.

STATEMENT OF GOVERNMENT INTEREST

This invention was made with United States Government support under Contract No. N00014-07-C-0292 awarded by the Office of Naval Research (ONR) US Navy. The United States Government has certain rights in this invention

BACKGROUND OF THE INVENTION

Technical Field

The technical field relates to shearography. Specifically, the technical field relates to a remote sensing system and method which may be used in airborne applications of shearography using an algorithm to generate shearograms from raw specklegram images collected from an airborne shearography system.

Background Information

Shearography is an optical, Non-Destructive Testing (NDT) technique that provides fast and accurate indications about internal material discontinuities or anomalies in non-homogenous materials. Using laser light, a shearing interferometer is able to detect extremely small (sub-micrometer) changes in surface out-of-plane deformation. Shearography allows users to measure and qualify both large and small complex geometries quickly and efficiently, yielding near real-time results. However, sometimes shearography is relatively inefficient or impractical. For instance, non-phase resolved (NPR) shearography is unable to resolve the phase of an acousto-seismic signal and requires the use of high power laser sources. This limitation means that (a) inversion methods cannot be applied to the output to identify scattering sources or targets of interest in the acousto-seismic signal, and (b) this type of system is impractical for aircraft and other fast moving platforms that require large area coverage rates.

Generally, in shearography, a target surface, part or area being observed, is illuminated by an expanding laser beam, and two time sequential images are captured of the target surface, part or area with an image-shearing camera. The first image is taken of the surface, and the second image is taken of the same surface a short time thereafter during deformation or loading of the surface. The two images taken are processed together to produce a third image (a shearogram) showing a fringe pattern that depicts the gradient of the displacement of the surface due to some loading of the surface between the first and second images.

There is a need, however, to remotely measure the full phase and amplitude information of small scale acousto-seismic vibrations in order to detect the presence of buried objects (e.g. mines, tunnels etc.) or for other purposes. This remote sensing information may need to be collected with a large area coverage rate and at a safe standoff distance. A need still continues to exist for an improved way to generate phase resolved shearograms from an aircraft or other moving platform.

SUMMARY

A method comprising providing a specklegram set comprising a plurality of specklegram images of a target surface; high pass filtering the specklegram images; co-registering the specklegram images to produce a co-registered specklegram set such that speckle patterns in the plurality of co-registered specklegram images are aligned with one another; generating a shearogram image from the co-registered specklegram set; and using the shearogram image to detect surface changes of the target surface.

A system comprising shearography equipment comprising an interferometer which has a processing unit and is configured to collect a plurality of specklegram images of a target surface; wherein the processing unit is configured to high pass filter the specklegram images, co-register the specklegram set to produce a co-registered specklegram set such that speckle patterns in the plurality of specklegram images are aligned with one another, and generate a shearogram image from the co-registered specklegram set such that the shearogram image is usable to detect surface changes of the target surface.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
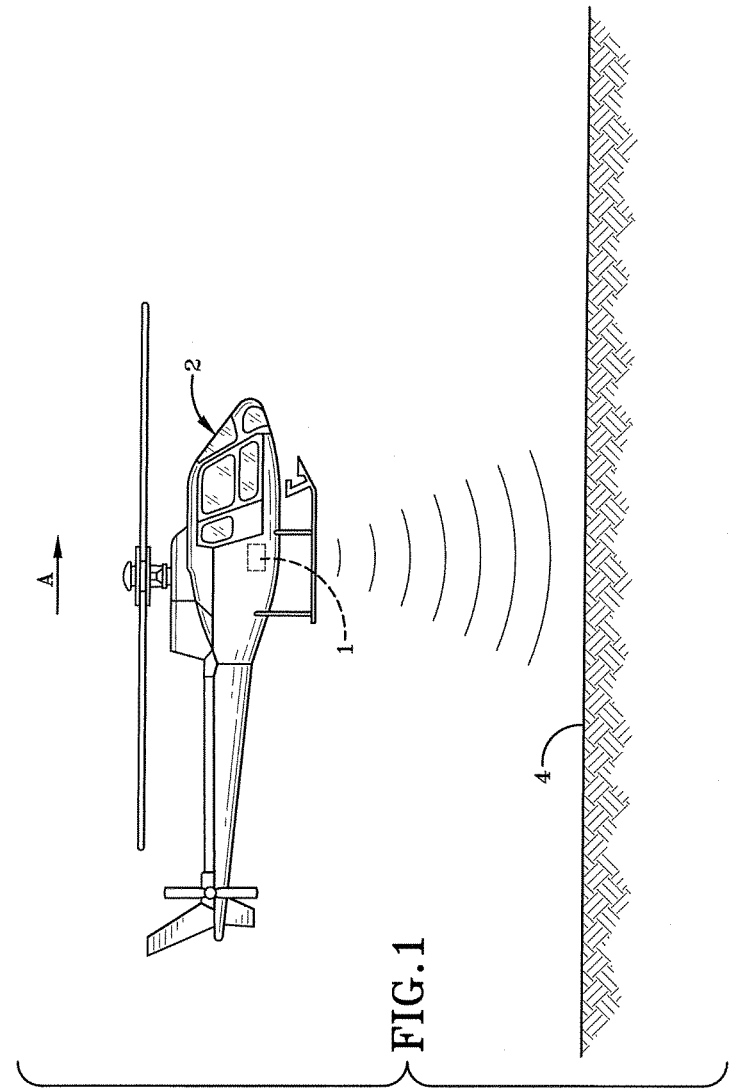
FIG. 1 is a diagrammatic view of a shearography system mounted on a moving platform shown in the form of a helicopter.

FIG. 1 shows a shearography system or apparatus 1 which may be a temporal-stepping shearography apparatus of a system which may comprise a Michelson or other type of interferometer which in one embodiment includes one or more laser transmitters, a beam splitter, a pair of mirrors, an image-shearing camera or sensor and a computer or central processing unit (CPU). Shearography equipment or apparatus 1 may be mounted on a moving platform 2. Although shown as a helicopter, platform 2 represents any suitable moving platform such as a ship, aircraft, or vehicle which carries equipment 1 whereby equipment 1 moves with platform 2 relative to a target or target surface 4 during operation of equipment 1. This movement of platform 2 and apparatus 1 is shown at Arrow A. Platform 2 may include powered transport or vehicles such as aircraft, watercraft (surface craft or underwater craft), spacecraft or land motor vehicles which may be manned or unmanned, whereby, for instance, an aircraft may be a manned/piloted aircraft or an unmanned aerial vehicle (UAV). Platform 2 may also be a handheld device which may move simply as a result of being carried by a person who is moving (under his or her own power or via a powered vehicle) or by being carried by one of the other moving platforms noted above. As described in the below-noted DeWeert et al. reference, a target excitation device, (not shown) may be provided in various forms to non-destructively deform or load target 4. The target excitation device may be an onboard excitation device mounted on moving platform 2 or may be a separate excitation device which is separate from or not on moving platform 2. The target excitation device may be, for instance, a sound driver or acoustic source or speaker capable of producing or emitting sound waves, for example, a relatively high power, low frequency sound wave which is directed from moving platform 2/apparatus 1 toward the ground or other target surface 4 to vibrate (deform or load) the ground or other target 4. The target excitation device when separate from platform 2 may be, for example, a seismic thumper which may be in the form of a thumper truck, which may also be known as a vibroseis truck or vibe truck. A seismic thumper may impact or be directed toward the ground or other target to likewise vibrate (deform or load) the ground or other target 4. US Patent Application Publication 2015/0338208 of DeWeert et al. describes a shearography apparatus or system and methods which may be used with or be part of the systems and methods described herein. Said Publication is incorporated fully herein by reference.

System 1 includes an algorithm and method to generate shearograms from raw specklegram images collected from the shearography equipment thereof. System 1 may be an airborne shearography system known as Synoptic Airborne Multi-Sensor Systems (SAMSS). SAMSS is an airborne system configured to extend capabilities such as detecting and characterizing mines, IEDs, and other underground or underwater objects of military interest. System 1 in one example provides motion-compensated shearography as described in the below-noted Kokobun reference, which is a practical and robust method for finding hidden structures and objects. The algorithm and method disclosed herein can be used for the following and other purposes: 1) mine and IED detection; 2) airborne detection and characterization of underground tunnels, bunkers, and structures; 3) rapid scanning of ship hulls and aircraft for hidden structural defects; 4) rapid pipeline inspection; and 5) non-contact acoustic sensing for in-water and underground sources. The algorithm and method includes several steps, including co-registration of specklegram images used to align and emphasize the high frequency speckle noise structure of the images. It performs illumination normalization on input images and allows generation of both phase resolved (PR) and non-phase resolved (NPR) specklegram images using multiple techniques. U.S. Pat. No. 8,717,577 granted to Kokobun et al. and entitled "Compensating aperture for utilizing shearography from a moving platform" describes a motion compensated shearography apparatus or system and methods which may be used with or be part of the systems and methods described herein. Said Publication is incorporated fully herein by reference.

In operation, as platform 2 and equipment 1 are moving relative to target 4, the target excitation device is used to excite target surface 4, such as with acoustic energy or seismic energy, which can cause different surface deformations of target surface 4, such as over buried objects relative to the background. These deformations are measured with laser shearography techniques, by illuminating the ground or other target surface 4 with coherent laser light emitted from the laser transmitters of equipment 1, collecting specklegrams or specklegram images over the illuminated region with a shearing interferometer of equipment 1, and generating shearograms from the collected specklegrams.

More specifically, one of the one or more laser transmitters of shearography equipment 1 transmits, emits or shoots a laser beam which impacts target surface or target area 4 and is reflected from surface 4 as a reflected laser beam image back to apparatus 1 into the beam splitter, onto the mirrors and into the image shearing camera, which captures the reflected image in two copies which are laterally displaced (sheared image copies) and combined to form a specklegram. The reflected laser beam images and specklegrams are collected and stored or saved in a memory of the equipment 1 computer or CPU, which includes a computer program of the shearography system which is configured to process the specklegrams to produce a shearogram from which can be discerned surface changes of target surface 4 and corresponding subsurface structures or movements. The computer program run by the CPU is configured to perform and calculate the various relevant steps and equations discussed herein in order to effect the methods discussed herein.

Figure 2:
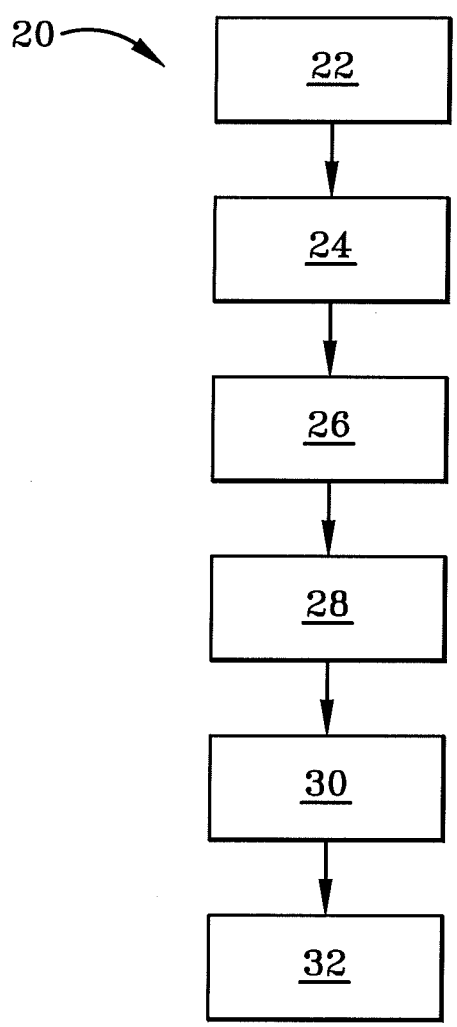
FIG. 2 is a flow chart showing a shearography method.

FIG. 2 shows a process or method 20 of a shearogram generation algorithm which includes several steps, such as providing a set or plurality of specklegrams or specklegram images from shearography equipment 1 (block 22); inputting the set or plurality of specklegrams (block 24) (or providing as an input image the specklegram set) into or to a suitable computer program which is run on the computer or processing section of system 1; filtering with a high pass filter and normalizing the input specklegrams (block 26); co-registering the input, filtered and normalized specklegrams (block 28); generating shearograms from the filtered and normalized specklegrams (block 30); and displaying the shearograms (block 32), such as on a monitor or display screen and/or using the shearograms to detect target surface changes/subsurface structures or movements.

Method or algorithm 20 typically takes inputs of a series of at least four specklegrams collected from a moving platform. These specklegrams are co-registered such that the speckle patterns in each specklegram are aligned together or with one another. Co-registration may be accomplished by applying normalization and filtration by a high pass filter to the images. Then, a Fast Fourier Transform (FFT) process can be applied to locate the cross-correlation maximum. The high pass filtering process suppresses illumination variation across images and maximizes the high frequency speckle noise content of the imagery. The cross-correlation process determines the translational offset between pairs of filtered specklegrams. The translational offsets are used to co-reregister the specklegram set. Shearograms are then generated from the set of four co-registered filtered specklegrams.

Input specklegrams are high-pass filtered (spatially filtered) and normalized to suppress low spatial frequency variation in the images so that filtered output high frequency speckle noise dominates in the resultant. The high pass normalization filter first applies a low pass filter by convolving the input specklegram image with a normalized filter kernel to produce a low pass filtered specklegram image. Either a rectangular (boxcar) filter kernel or a Gaussian filter kernel can be used for this operation. A filter kernel herein is an array of numbers or elements, and normalized filter kernel herein means that the sum of elements in the filter kernel is one. For instance, a 5×5 normalized boxcar filter kernel is a 5×5 array of elements, each with the value of 1/(5×5)=1/25. In practice, application of a normalized filter kernel to an image (convolving the filter kernel with the image) leaves the mean value of the image unchanged.

The low pass filtered image LP may be obtained by convolving the input image I with the low pass filter kernel K:

$$LP = I \otimes K$$

For a square boxcar filter kernel of dimension (2m+1), K can be written as $$K(2m+1) = \frac{1}{(2m+1)^2} M$$

where M is a (2m+1)×(2m+1) matrix with $M_{i,j}=1$ for all matrix elements. For this case, the elements of the filtered image LP are given by $$LP(i, j) = \frac{1}{(2m+1)^2} \sum_{k=-m}^{k=m} \sum_{l=-m}^{l=m} I(i+k, j+l)$$

The effect of the low pass boxcar filtering operation is to replace I(i, j) by a local average computed in a (2m+1)×(2m+1) square region center at pixel I(i, j).

The original input specklegram image is then divided by the low pass filtered specklegram image, producing a high pass filtered normalized specklegram image as an output. Particularly, the division process is applied on a pixel-by-pixel basis, that is, if Output (i,j), Input (i,j), and LP (i,j) represents a pixel in the output image, input image, and low pass filtered image respectively, then Output (i,j)=Input (i,j)/LP (i,j). More particularly, the low pass filter kernel should be selected such that it is sufficiently large compared to a spot size (in pixel) produced by sensors or image shearing cameras, but smaller than the typical intensity variations across the image. For example, a sensor or image shearing camera with a spot size of order 1-pixel, a 21×21 pixel rectangular filter kennel (boxcar) is effective.

For shearographic systems the nominal spot size generated by an image shearing camera with a diffraction limited lens is approximately 1 pixel as measured on the camera's focal plane. In a system using 532 nm laser light, the physical spot size on the focal plane is approximately $$\text{spot\_size} = (f/\#) \times 1.3\mu$$

In constructing a shearography system, a lens is typically chosen with an f-number (f/#) that produces a spot size about equal to one pixel on the focal plane (the pixel pitch), i.e., $$\frac{(f/\#) \times 1.3\mu}{\text{pixel-pitch}} \approx 1$$

For typical 1-pixel spot size systems, the filter kernel may be at least 11×11 pixels, i.e., m=5 in a (2m+1)×(2m+1) filter kernel. Intensity variations across the image may either be caused by illumination non-uniformity of the laser source or reflectivity variation across the scene. The actual scale of the intensity variation can change from scene to scene.

Figure 3A:
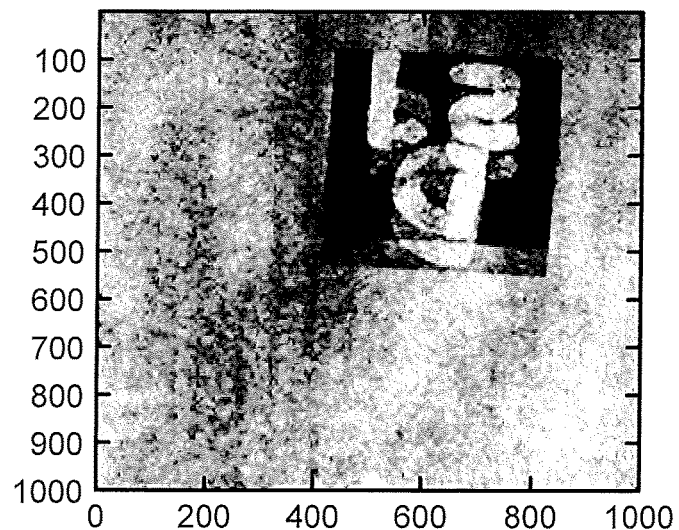
FIG. 3A shows an input specklegram.
Figure 3B:
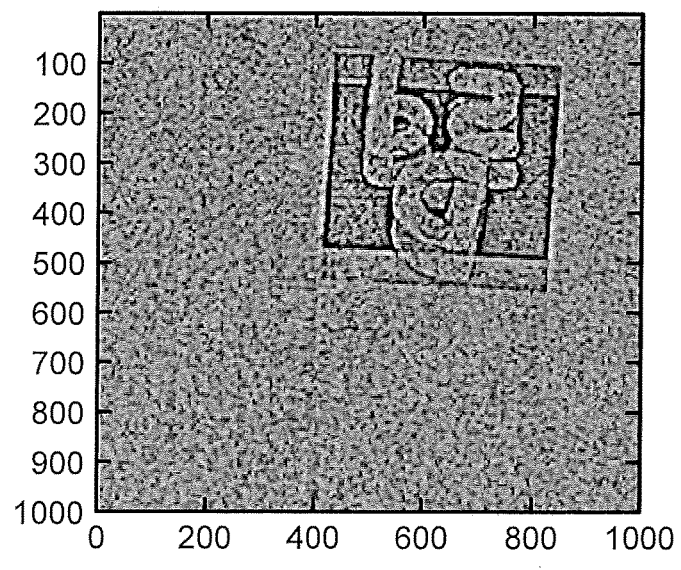
FIG. 3B shows the input specklegram of FIG. 3A after being high pass filtered.

Table 1 below shows a MatLab implementation of a high pass filter kernel. Correspondingly, FIGS. 3A and 3B show the effect of the high pass filter on an input specklegram. More particularly, FIG. 3A shows the input specklegram and FIG. 3B shows the high pass filtered specklegram produced from the high pass filtering of the input specklegram of FIG. 3A. As shown by FIGS. 3A and 3B, this high pass filtering process is effective in suppressing non-uniform illumination in the specklegram imagery and greatly improves the rate of successful image co-registration.

TABLE 1

```
normfilt = ones(21,21) / (21^2);
% Smooth the specklegrams prior to registration
div1 = filter2(normfilt, speck1_img);
div2 = filter2(normfilt, speck2_img);
div3 = filter2(normfilt, speck3_img);
div4 = filter2(normfilt, speck4_img);
speck1_img = speck1_img ./ div1;
speck2_img = speck2_img ./ div2;
speck3_img = speck3_img ./ div3;
speck4_img = speck4_img ./ div4;
```

At least four specklegrams are typically used to generate phase resolved (PR) shearograms. A given set of specklegrams is co-registered prior to generating a shearogram from that given set. A top level image co-registration procedure is illustrated in Table 2 below and its corresponding MatLab code snippet is provided in Table 3 below.

TABLE 2

| Compute registration offset | → | Compute Registration Offsets | → | Shift |
|---|---|---|---|---|
| Speck4 to Speck1 Using dftRegM Function | | Speck2-Speck1 Speck 3-Speck1 By interpolation | | Speck4, Speck3, Speck1 To Speck1 Basis |

TABLE 3

```
%calculate registration offset speck4_img relative
to speck1_img
   [dX4 dY4] = dftRegM(speck1_img, speck4_img, 1);
% interpolation method
   dX2 = dX4/3;
   dY2 = dY4/3;
   dX3 = 2*dX4/3;
   dY3 = 2*dY4/3;
%shift images
   speck2_img = imgShift(speck2_img, dX2, (−1.0*dY2));
   speck3_img = imgShift(speck3_img, dX3, (−1.0*dY3));
   speck4_img = imgShift(speck4_img, dX4, (−1.0*dY4));
```

In the co-registration procedure, as shown in Table 2, a computation of registration offset between pairs of specklegrams is performed to compute a given shift value. For instance, a shift value may be computed between the first and second specklegrams, another shift value may be computed between the first and third specklegrams, and another shift value may be computed between the first and fourth specklegrams, so that the second, third and fourth specklegrams may be shifted to the basis or frame of reference of the first specklegram. For example, a shift value (translation offset) between the first and fourth specklegrams (specklegrams #1 and #4) collected in the specklegram set is computed by finding the pair of X and Y translation values that maximize the cross-correlation between the two images. Second and third shift values for intermediate specklegrams (specklegrams #2 and #3) may then be computed by linear interpolation. The velocity of the moving platform 4 and equipment 1 can be set constant over the short period (less than milliseconds) when the specklegram set is acquired.

Figure 4A:
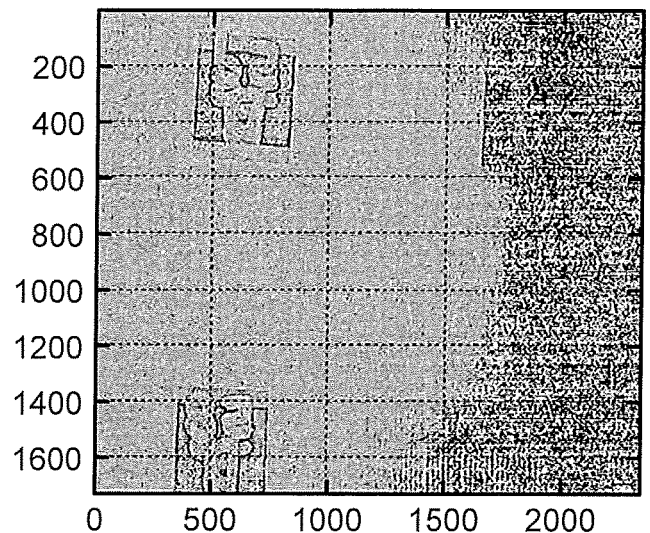
FIG. 4A shows a first specklegram of a four-specklegram set.
Figure 4B:
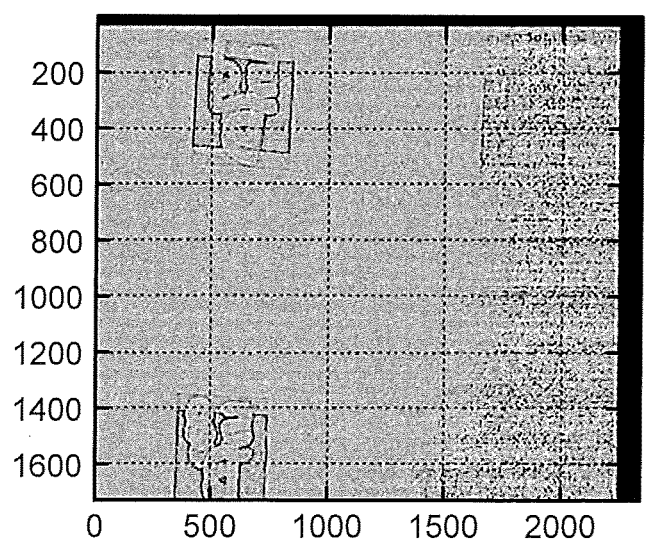
FIG. 4B shows a fourth specklegram of the four-specklegram set which has been shifted to the frame of reference of the first specklegram.

FIGS. 4A and 4B show the computing step of the image co-registration procedure of Table 2, wherein an image co-registration process is applied to flight test data. Particularly, FIG. 4 illustrates an image shift operation, with FIG. 4A showing the first specklegram or specklegram image (specklegram #1), and FIG. 4B showing the fourth specklegram image (specklegram #4) shifted to the frame of reference of the first image. In the example given in FIG. 4B, the fourth image (specklegram #4) has been shifted or translated by [−99.3, 40.1] pixels so that it is co-registered with the first image (specklegram #1).

Figure 5A:
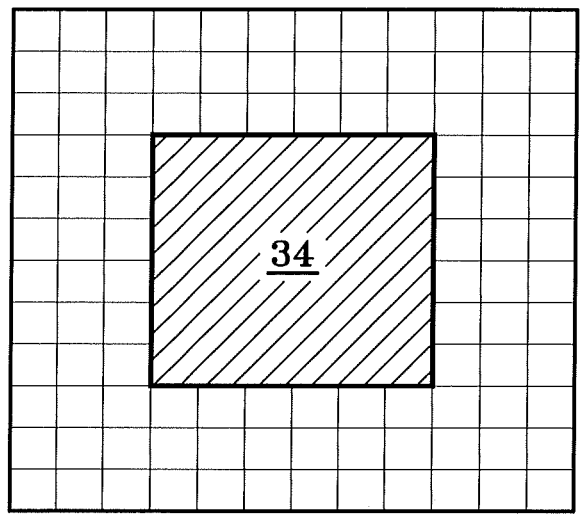
FIG. 5A shows a primary sub-region of input images used in image co-registration.
Figure 5B:
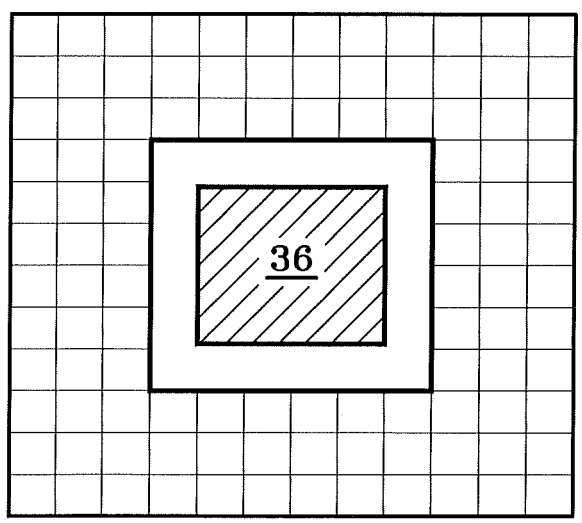
FIG. 5B shows a secondary sub-region of input images used in image co-registration.

In one example, the image registration is more robust if it is calculated using only the central portion of the image. The process may make two attempts to find a desirable or best co-registration solution for the specklegram pair using two image partitions. First, for example, a primary sub-region 34 such as shown in FIG. 5A (and which may be one half (½) of the central image) may be selected and sent to a cross correlation process to produce a valid registration solution which is defined as a shift of at least 2 pixels in either the x or y direction. If translation values (dx,dy) are greater than the minimum valid registration shifts, the translation values (dx,dy) can then be used as offset values. If the calculated translation values are less than the valid registration values, then a secondary sub-region 36 such as shown in FIG. 5B (and which may be for example a one-third (⅓) of the central image) may be used to produce the valid registration solution. FIGS. 5A and 5B thus show primary and secondary sub-regions 34 and 36 of the input image which may be used for the specklegram pair co-registration by cross-correlation calculations, wherein if a co-registration solution is not found using the primary sub-region 34, a second attempt may be made using the secondary sub-region 36 of the input image.

Table 4 below depicts top level MatLab implemented functions ("dftRegM" and "dftReg") which may handle image registration, calculating translational offsets dX,dY. The function "dftRegM" is used to define sub-setting options. The function "dftReg" is used to 1) apply the sub-setting options; 2) take the Fourier transform of the filtered image segment; and 3) call a cross-correlation function "dftregistration".

TABLE 4

```
function [dx dy] = dftRegM(img1,img2)
%first call
```

TABLE 4-continued

```
display('mode M');
subset=4;
[dx1 dy1] = dftReg(img1,img2,subset);
%test result
MShift=max(abs(dx1),abs(dy1));
if (MShift<2)
    subset=3;
    display('trying alternate registration')
    [dx dy] = dftReg(img1,img2,subset);
else
    dx=dx1;
    dy=dy1;
end
function [dx dy] = dftReg(img1,img2,subset)
    % subset image (crop out lo signal regions)
    % (NN=4); use NN=3 for central third
    if (nargin > 2 && subset ~= 0)
        NN=subset;
    % determine lines/samples corresponding
    to central half of image
    % (NN=4); use NN=3 for central third
    [lines1,samples1]=size(img1);
    LL1=round(lines1./NN);
    LS1=round(samples1./NN);
    UL1=lines1-LL1;
    US1=samples1-LS1;
    [lines2,samples2]=size(img2);
    LL2=round(lines2./NN);
    LS2=round(samples2./NN);
    UL2=lines2-LL2;
    US2=samples2-LS2;
    img1 = img1(LL1:UL1,LS1:US1);
    img2 = img2(LL2:UL2,LS2:US2);
    end
    % take FFT of each image
    I1 = fft2(img1);
    I2 = fft2(img2);
    % call the script from Mathworks
    [output] = dftregistration(I1,I2,10);
    % extract shift values
    dx = output(4);
    dy = output(3);
end
```

Once a pair of translational offsets (dx,dy) is determined for a given specklegram, here the fourth specklegram, the given or fourth specklegram image (specklegram #4) is then shifted to the frame reference of the first specklegram image (specklegram #1). The second specklegram image (specklegram #2) and the third specklegram image (specklegram #3) are shifted to the frame reference of the first specklegram (specklegram #1) by 2-dimensional linear interpolation of the input image to new pixel center coordinate shifted by (dx,dy). This image shifting may be implemented in the MatLab function "imgShift" shown in Table 5 below.

TABLE 5

```
% function ims = imgShift(img,dx,dy)
%
function ims = imgShift(img,dx,dy)
    if ( isnan(dx) )
        error('Illegal value for input argument "dx"; must
be a positive integer.');
    end
    if ( isnan(dy) )
        error('Illegal value for input argument "dy"; must
be a positive integer.');
    end
    [r c b] = size(img);
    if (b>1)
        error('Function "imgShift" only defined for single
band images.');
    end
    [X,Y] = meshgrid(1:c,1:r);
    [XI,YI] = meshgrid((1-dx):1:(c-dx),(1+dy):1:(r+dy));
```

TABLE 5-continued

```
    ims = interp2(X,Y,double(img),XI,YI);
end
```

The preprocessed (i.e., high pass filtered and normalized) co-registered specklegrams can now be combined to produce both phase-resolved (PR) and non-phase resolved (NPR) shearograms. The process may, for instance, support the following three PR shearogram methods and NPR shearogram method:

PR method 1 (Baseline method)

$$Shr_{PR1} = \frac{1}{\sqrt{3}}\left(\frac{Speck_4 - Speck_1}{Speck_2 - Speck_3}\right) \quad (1)$$

PR method 2 (Peak Straddling method)

$$Shr_{PR2} = \frac{(Speck_2 - Speck_1) + (Speck_2 - Speck_3) + (Speck_2 - Speck_4)}{(Speck_2 - Speck_1) + (Speck_3 - Speck_4)} \quad (2)$$

PR method 3 (Generic method)

$$Shr_{PR3} = \frac{2 \cdot (Speck_2 - Speck_1) + (Speck_2 - Speck_3)}{(Speck_2 - Speck_1) + (Speck_3 - Speck_1)} \quad (3)$$

NPR method 1

$$Shr_{NPR} = |Speck_4 - Speck_1| \quad (4)$$

where $Speck_1$, $Speck_2$, $Speck_3$, and $Speck_4$ are the input set of co-registered specklegram images. Each image set is acquired over a time span on the order of ¼ to ½ the period of the ground vibration (or other target vibration), thereby ensuring that the image set covers a significant fraction of the available ground (target) amplitude change. For example, if specklegrams are collected at a rate of 1 KHz, then the time period over which a four-specklegram set is collected is three (3) milliseconds. This sampling rate is nominal for detecting ground (target) vibration with periods in the range if 6-12 milliseconds (83-167 Hz).

Each of the three PR methods is optimized for a different phase relationship between the specklegram sampling time and the ground vibration. The raw shearograms are spatially filtered prior to display. The NPR shearogram may be filtered with a simple Gaussian filter. The PR shearograms are subject to "salt and pepper" type noise, and may be filtered using a median filter. The shearogram generation process including filtering may be implemented in the MatLab function shown in Table 6 below.

TABLE 6

```
function [shear_img] =
make15Sharorgrams(speck1_img,speck2_img,speck3_img,
speck4_img,method, mf)
% function to compute gen 1.5 PR and NPR shearograms from
a set of 4 input
% specklegrams
%INPUT:
%    specklegrams (all specklegrams are assumed co-registered)
%speck1_img input specklegram #1
%speck2_img input specklegram #2
```

TABLE 6-continued

```
%speck3_img input specklegram #3
%speck4_img input specklegram #4
% method:
% 0 =NPR
% 1 =PR method 1 original method (use as default)
% 2 =PR method 2 peak straddling
% 3 =PR method 3 generic
%
% mf= median filter kernal size (should be 5,9 or 13 only)
    For method=0 no median filter is applied
switch method
    case 0 %NPR Shrearogram
        h = normpdf(1:7,4,1.5);
        h = h' * h;
        shear_img = filter2(h,abs(speck4_img - speck1_img));
    case 1   % Standard PR this uses "original" normalization
factor
        T_41=speck4_img-speck1_img;
        T_23=speck2_img-speck3_img;
        shear_img = ((1*T_41)./(sqrt(3)*T_23));
        shear_img=medfilt2(shear_img,[mf,mf]);
    case 2 % Peak Straddling case (no normalization included)
        TM2_1=((speck2_img-speck1_img) + (speck2_img-
speck3_img) + (speck2_img-speck4_img));
        TM2_2=((speck2_img-speck1_img) + (speck3_img-
speck4_img)); shear_img=TM2_1./TM2_2;
        shear_img=medfilt2(shear_img,[mf,mf]);
    case 3 % Generaic case (no normalization included)
        TM3_1=(2*(speck2_img-speck1_img) + (speck2_img-
speck3_img));
        TM3_2=((speck2_img-speck1_img) + (speck3_img-
speck1_img));
        shear_img=TM3_1./TM3_2;
        shear_img=medfilt2(shear_img,[mf,mf]);
    otherwise
        disp('invalid method');
end
```

Figure 6A:
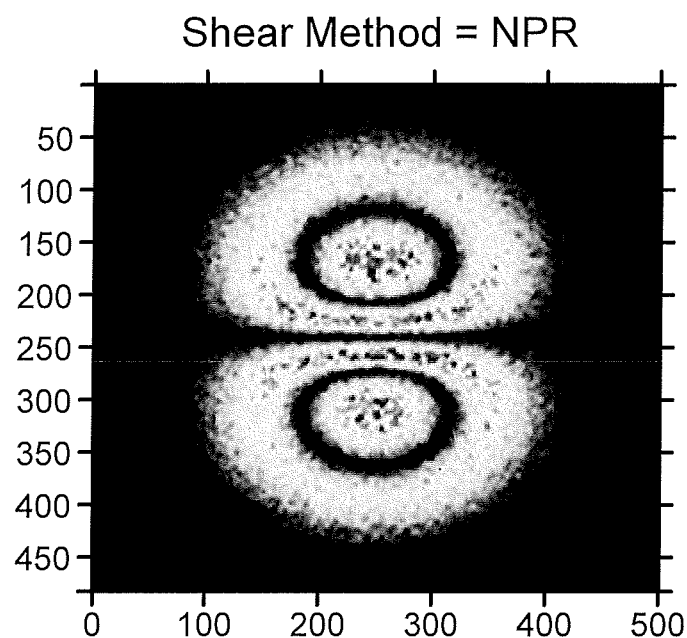
FIG. 6A shows an example of one type of non-phase resolved (NPR) shearogram generated from a set of input specklegrams.
Figure 6B:
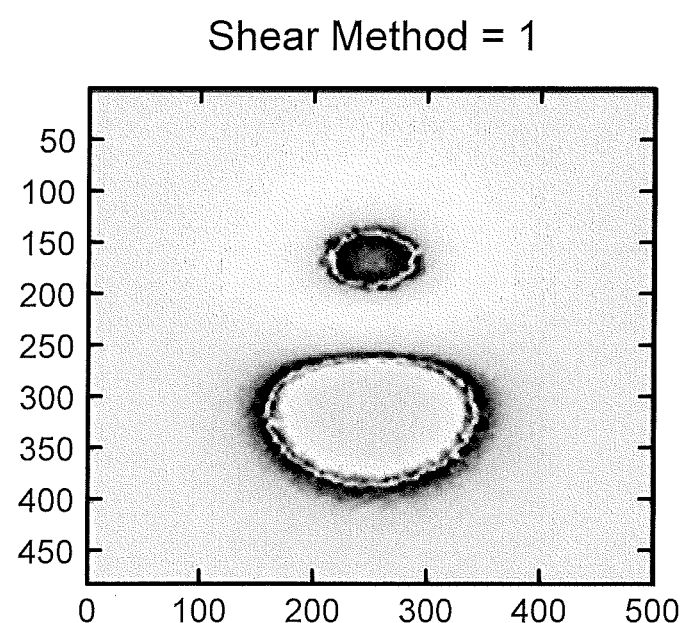
FIG. 6B shows an example of one type of phase resolved (PR) shearogram generated from a set of input specklegrams.
Figure 6C:
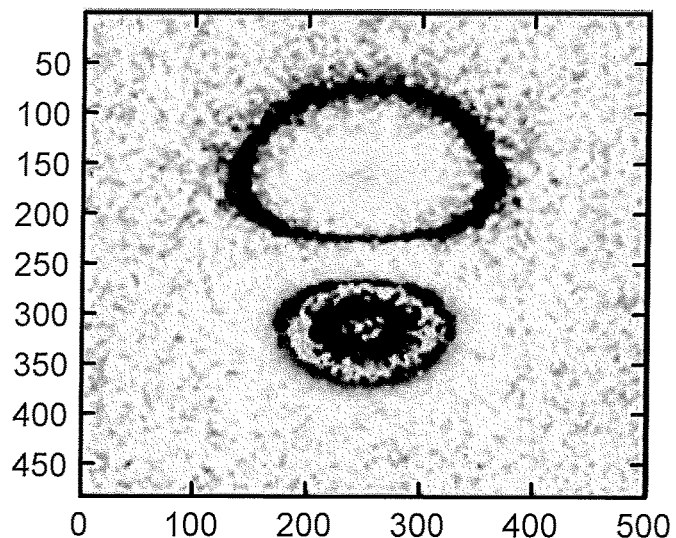
FIG. 6C shows another example of one type of PR shearogram generated from a set of input specklegrams.
Figure 6D:
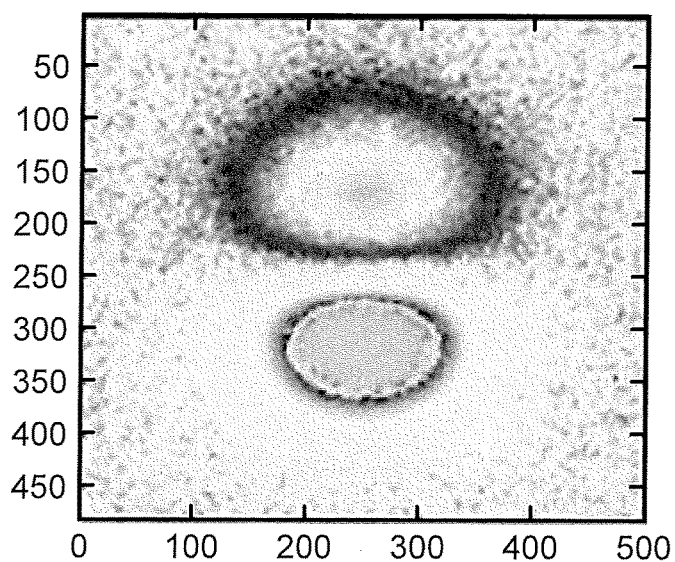
FIG. 6D shows another example of one type of PR shearogram generated from a set of input specklegrams.
Figure 7A:
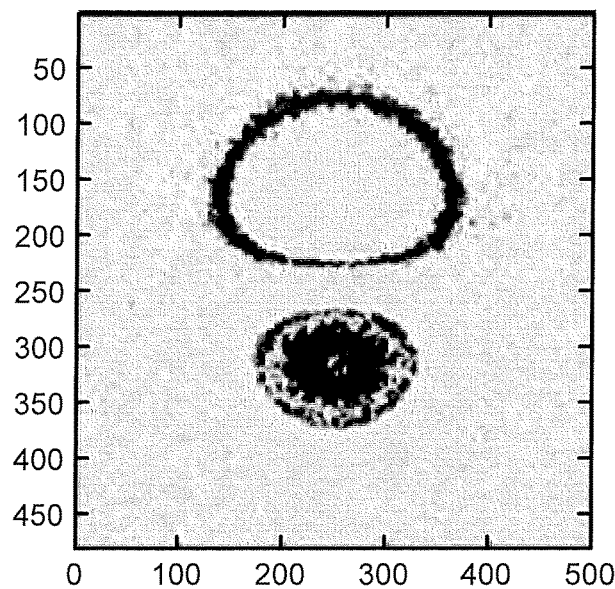
FIG. 7A illustrates removal of large DC offsets in the PR specklegram method of FIG. 6B.
Figure 7B:
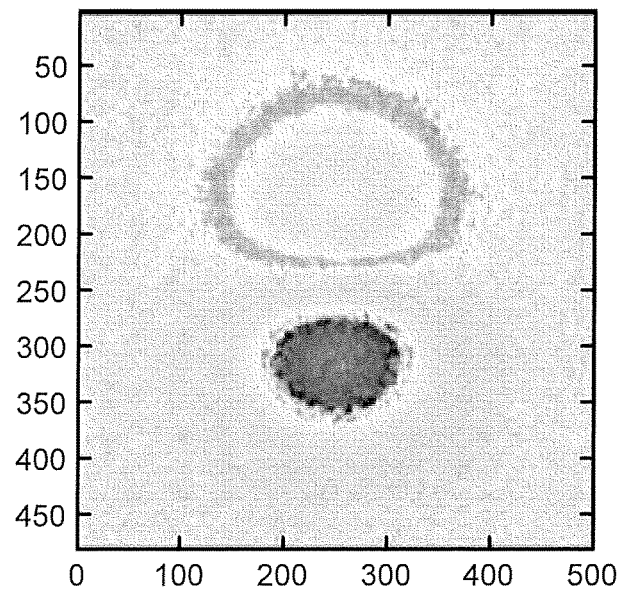
FIG. 7B illustrates removal of large DC offsets in the PR specklegram method of FIG. 6D.

Sample shearograms generated from this MatLab script are shown in FIGS. 6A-D. In particular, FIG. 6A shows an example of one type of non-phase resolved (NPR) shearogram generated from a set of input specklegrams and FIGS. 6B, 6C and 6D show examples of three types of phase resolved (PR) shearograms generated from a respective set of input specklegrams, wherein the set of input specklegrams were generated from a simulation model. All shearograms were generated from the same set of (model generated) input specklegrams. As shown in FIGS. 7A and 7B, any of the large DC offsets in the second phase resolved (PR) specklegram method and the third phase resolved (PR) specklegram method are easily removed by subtracting the average background value from each shearogram.

The use of shearagraphy equipment 1 and the shearograms or shearogram images produced thereby allow for the discernment, detection or identification of underground anomalies such as underground ordnance or landmines (including improvised explosive devices or IED) or other subsurface or underground objects or structures such as rooms, tunnels, pipes and so forth. Shearogram images may be used to detect subsurface structures or movements in a target which defines the target surface, including underground and underwater objects or structures or movements. Subsurface movements may include leaking underground pipes (e.g., movement of water or other liquid) or the digging or building of a tunnel or underground room.

The present shearography system and process may also be used in the medical field, for instance, including non-contact monitoring of respiration, non-contact cardiograms and non-contact ultrasound imaging. There may be many other uses—any phenomenon (such as sound) which can convey information from inside a body to make a physical change in the surface might be exploited. In such cases, target surface 4 may, for instance, represent a skin surface of a person (or animal) undergoing the respective shearography procedure, which would thus allow via shearograms for the determining or ascertaining subsurface structures or movement within a human body (or animal).

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration set out herein are an example and not limited to the exact details shown or described.

The invention claimed is:

1. A method comprising:
providing a specklegram set comprising a plurality of specklegram images of a target surface;
high pass filtering the specklegram images;
co-registering the specklegram images to produce a co-registered specklegram set such that speckle patterns in the plurality of co-registered specklegram images are aligned with one another;
generating a shearogram image from the co-registered specklegram set; and
using the shearogram image to detect surface changes of the target surface.

2. The method of claim 1 wherein the plurality of specklegram images comprises at least four specklegram images.

3. The method of claim 1 wherein using the shearogram image comprises using the shearogram image to detect subsurface structures or movements.

4. The method of claim 1 wherein the high pass filtering comprises low pass filtering the input image to produce a low pass filtered image; and dividing the input image by the low pass filtered image.

5. The method claim of 4 wherein the low pass filtering is achieved with one of a rectangular filter kernel and a Gaussian filter kernel.

6. The method of claim 2 wherein the co-registering comprises shifting three of the at least four specklegram images to a frame of reference of the other of the at least four specklegram images.

7. The method claim of 2 wherein the at least four specklegram images comprise first, second, third and fourth specklegram images; and the co-registering comprises shifting each of the second, third and fourth specklegram images to a frame of reference of the first specklegram image.

8. The method claim of 7 wherein the co-registering comprises determining a first shift value between the first specklegram image and the second specklegram image, a second shift value between the first specklegram image and the third specklegram image and a third shift value between the first specklegram image and the fourth specklegram image.

9. The method of claim 6 wherein the calculation further comprises finding a pair of X and Y translation values which maximize the cross correlation between the first and fourth images.

10. The method of claim 9 further comprising computing a second shift value for the second specklegram image by linear interpolation based on the pair of X and Y translation values.

11. The method of claim 10 further comprising computing a third shift value for the third specklegram image by linear interpolation based on the pair of X and Y translation values.

12. The method of claim 6 wherein the co-registering comprises selecting a primary sub-region of a given one of the specklegram images; and producing a registration solution based on the primary sub-region.

13. The method claim of 12 wherein the registration solution is a valid registration solution defined as a shift of at least 2 pixels in a given direction.

14. The method claim of 12 wherein if the registration solution is not a valid registration solution, the co-registering further comprises selecting a secondary sub-region of the given one of the specklegram images; and producing a registration solution based on the secondary sub-region.

15. The method of claim 1 wherein the generation of the shearogram image from the specklegram set utilizes a baseline method for a phased-resolved shearogram, which is $$Shr_{PR1} = \frac{1}{\sqrt{3}} \left( \frac{Speck_4 - Speck_1}{Speck_2 - Speck_3} \right),$$

wherein $Speck_1$, $Speck_2$, $Speck_3$, and $Speck_4$ are the first specklegram image, the second specklegram image, the third specklegram image, and fourth specklegram image respectively.

16. The method of claim 1 wherein the generation of the shearogram image from the specklegram set utilizes a peak straddling method for a phased-resolved shearogram, which is $$Shr_{PR2} = \frac{(Speck_2 - Speck_1) + (Speck_2 - Speck_3) + (Speck_2 - Speck_4)}{(Speck_2 - Speck_1) + (Speck_3 - Speck_4)},$$

wherein $Speck_1$, $Speck_2$, $Speck_3$, and $Speck_4$ are the first specklegram image, the second specklegram image, the third specklegram image, and fourth specklegram image respectively.

17. The method of claim 1 wherein the generation of the shearogram image from the specklegram set utilizes a generic method for a phased-resolved shearogram, which is $$Shr_{PR3} = \frac{2 \cdot (Speck_2 - Speck_1) + (Speck_2 - Speck_3)}{(Speck_2 - Speck_1) + (Speck_3 - Speck_1)},$$

wherein $Speck_1$, $Speck_2$, $Speck_3$, and $Speck_4$ are the first specklegram image, the second specklegram image, the third specklegram image, and fourth specklegram image respectively.

18. The method of claim 1 wherein the generation of the shearogram image from the specklegram set utilizes a non-phased resolved shearogram, which is $$Shr_{NPR} = |Speck_4 - Speck_1|,$$

wherein $Speck_1$ and $Speck_4$ are the first specklegram image and fourth specklegram image respectively.

19. A system comprising:
shearography equipment comprising an interferometer which has a processing unit and is configured to collect a plurality of specklegram images of a target surface;
wherein the processing unit is configured to high pass filter the specklegram images, co-register the specklegram set to produce a co-registered specklegram set such that speckle patterns in the plurality of specklegram images are aligned with one another, and generate a shearogram image from the co-registered specklegram set such that the shearogram image is usable to detect surface changes of the target surface.

20. The system of claim 19 wherein the shearogram image is usable to detect subsurface structures or movements.

* * * * *